(12) United States Patent
Zheng et al.

(10) Patent No.: US 7,246,273 B2
(45) Date of Patent: Jul. 17, 2007

(54) METHOD OF, APPARATUS AND GRAPHICAL USER INTERFACE FOR AUTOMATIC DIAGNOSTICS

(75) Inventors: Jianyu Zheng, San Jose, CA (US); James Lin, Fremont, CA (US); Michael Chang, San Jose, CA (US); Hsin-jung Huang, Milpitas, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 680 days.

(21) Appl. No.: 10/639,061

(22) Filed: Aug. 11, 2003

(65) Prior Publication Data

US 2004/0193961 A1    Sep. 30, 2004

Related U.S. Application Data

(60) Provisional application No. 60/451,234, filed on Feb. 28, 2003.

(51) Int. Cl.
 *G06F 11/00* (2006.01)
(52) U.S. Cl. .................... 714/57; 714/36; 717/124
(58) Field of Classification Search ............... 714/36, 714/57, 37
See application file for complete search history.

(56) References Cited

U.S. PATENT DOCUMENTS

| | | | | |
|---|---|---|---|---|
| 5,434,395 A | * | 7/1995 | Storck et al. | 235/380 |
| 5,933,776 A | * | 8/1999 | Kirkpatrick | 455/423 |
| 6,032,255 A | * | 2/2000 | Shim et al. | 713/2 |
| 6,122,704 A | | 9/2000 | Hass et al. | 711/100 |
| 6,363,304 B1 | | 3/2002 | Ramsey | 701/35 |
| 6,429,629 B1 | | 8/2002 | Nguyen | 323/255 |
| 6,453,414 B1 | * | 9/2002 | Ryu | 713/2 |
| 6,523,073 B1 | | 2/2003 | Kammer et al. | 710/48 |
| 6,523,124 B1 | | 2/2003 | Lunsford et al. | 713/320 |
| 7,002,853 B2 | * | 2/2006 | Kozakai et al. | 365/189.03 |
| 2002/0052718 A1 | | 5/2002 | Little et al. | 702/188 |
| 2003/0009710 A1 | | 1/2003 | Grant | 714/37 |
| 2003/0014179 A1 | | 1/2003 | Szukala et al. | 701/114 |

FOREIGN PATENT DOCUMENTS

JP          07006028 A  *  1/1995

OTHER PUBLICATIONS

"Palm OS 5 Readiness Test Cases", Jun. 2002 (using internet archive), pp. 1-11.*
"Operating Instructions Personal Digital Organizer CLIE PEG-T665C", Sony, 2002, pp. 1-216.*
"Read This First Personal Digital Organizer CLIE PEG-T665C", Sony, 2002, pp. 1-3 and 13-18.*

* cited by examiner

*Primary Examiner*—Robert Beausoliel
*Assistant Examiner*—Emerson Puente
(74) *Attorney, Agent, or Firm*—Haverstock & Owens LLP

(57) ABSTRACT

The present invention includes a method, apparatus and graphical user interface (GUI) that allows a simple, precise, thorough, automatic and interactive diagnostic system for electronic devices. The present invention fully automates every test item, as a memory device including the diagnostic test items is inserted into the electronic device and is configured to automatically begin the diagnostic method. The present invention allows for interactive diagnostic analysis and a user is able to automatically repair many of the defects detected by the diagnostic method.

37 Claims, 6 Drawing Sheets

| | | |
|---|---|---|
| 410 — Mon 2/24/03 11:41 am | | |
| 420 — OS: v.5.0 | 450 | 460 |
| 430 — S/N: 123456789 | | |
| 440 — Buttons | Power | pass |
| Buttons | Datebook | pass |
| Buttons | Address | pass |
| Buttons | Up | pass |
| Buttons | Down | pass |
| Buttons | To Do | pass |
| Buttons | Memo | pass |
| Charging | Charging | fail |
| Light | Backlight | pass |
| Light | Brightness | pass |
| Soft Reset | Soft Reset | skip |
| LCD | LCD | pass |
| Digitizer | Digitizer | pass |
| IR Beaming | IR Beaming | pass |
| Jog Dial | Jog Up | pass |
| Jog Dial | Jog Down | pass |
| Jog Dial | Jog Press | pass |
| Jog Dial | Back | pass |
| Clie Buttons | Hold | pass |
| Clie Buttons | Capture | pass |
| MS | MS Detection | pass |
| MS | MS Write | pass |
| MS | MS Read | pass |
| RAM | RAM | pass |
| Sound | System Sound | pass |
| Sound | FM Speaker | pass |
| Sound | Headphone | pass |
| Hot Sync | Hot Sync | pass |

*Fig. 4*

METHOD OF, APPARATUS AND GRAPHICAL USER INTERFACE FOR AUTOMATIC DIAGNOSTICS

RELATED APPLICATIONS

This Patent Application claims priority under 35 U.S.C. § 119(e) of the co-pending U.S. provisional application Ser. No. 60/451,234 filed on Feb. 28, 2003 and entitled "CLIE DOCTOR." The provisional application Ser. No. 60/451,234 filed on Feb. 28, 2003 and entitled "CLIE DOCTOR," is also hereby incorporated by reference.

FIELD OF THE INVENTION

The present invention relates to the field of electronics diagnostics. More particularly, the present invention relates to the field of hardware and software diagnostics of electronic devices such as personal digital assistants.

BACKGROUND OF THE INVENTION

The proliferation of electronic devices, specifically handheld electronic devices, places a new importance on thorough, precise and accurate diagnostic systems to detect hardware and software problems. Oftentimes, electronic devices that are believed to have defects are returned by retailers to manufacturer service centers at the manufacturer's expense without having any real problem at all. High volumes of such returns can obviously cost a manufacturer a significant amount of money.

Current diagnostic systems utilized by the retailer's personnel usually include a technician using a paper based flow chart to manually diagnose problems with returned electronic devices. Oftentimes, these flow charts are difficult to follow, imprecise and not thorough in the terms of the number of test items available. Compounding the problem is the high turnover rate of technicians employed by the retailers of electronic devices. Furthermore, current diagnostic systems are not automatic nor interactive.

SUMMARY OF THE INVENTION

The present invention includes a method, apparatus and graphical user interface (GUI) that allows a simple, precise, thorough, automatic and interactive diagnostic system for electronic devices. The present invention fully automates every test item, as a memory device including the diagnostic test items is inserted into the electronic device and is configured to automatically begin the diagnostic method. The present invention allows for interactive diagnostic analysis and a user is able to automatically repair many of the defects detected by the diagnostic method.

In one aspect of the present invention, a method of automatically diagnosing software and hardware defects in an electronic device comprises inserting a removable memory into the electronic device, the removable memory including an application, executing the application automatically upon insertion of the removable memory into the electronic device, completing a set of test features included in the application and generating a log file including a set of results corresponding to the set of test features, wherein completion of the set of test features is confirmed automatically by the application. The method further comprises setting a hold button to an off position, wherein the hold button is set to the off position before the removable memory is inserted into the electronic device. The method further comprises performing a hard reset on the electronic device, wherein the hard reset is performed before the hold button is set to the off position. The set of test features includes a set of basic OS features including a set of OS button tests. The set of OS button tests include one or more of a power button test, a datebook button test, an address button test, an up button test, a down button test, a to do button test and a memo button test. The set of test features includes a set of device features including one or more of a charging test, a light test, wherein the light test includes a backlight test and a brightness test, a soft reset test, an LCD test, a digitizer test, an IR beaming test, a device specific buttons test and a jog dial test. The device specific buttons test includes one or more of a hold button test, a capture button test, a record button test, a home button test and a graffiti button test. The jog dial test includes one or more of a jog up test, a jog down test, a jog press test and a back test. The set of test features includes a set of advanced device features including one or more of a memory stick test, wherein the memory stick test includes a memory stick detect test, a memory stick write test and a memory stick read test, a RAM test, a sound test, wherein the sound test includes a system sound test, a FM speaker test and a headphone test and a hotsync test. The set of results includes a main test listing, a sub-test listing and a test result listing for each of the set of test features. The method further comprises interfacing a user and the electronic device with a graphical user interface, wherein the user manually confirms completion of one or more of the set of test features.

In another aspect of the present invention, a diagnostic system for automatically diagnosing software and hardware defects in an electronic device comprises means for inserting a removable memory into the electronic device, the removable memory including an application, means for executing the application automatically upon insertion of the removable memory into the electronic device, means for completing a set of test features included in the application and means for generating a log file including a set of results corresponding to the set of test features, wherein completion of the set of test features is confirmed automatically by the application. The system further comprises means for setting a hold button to an off position, wherein the hold button is set to the off position before the removable memory is inserted into the electronic device. The system further comprises means for performing a hard reset on the electronic device, wherein the hard reset is performed before the hold button is set to the off position. The set of test features includes a set of basic OS features including a set of OS button tests. The set of OS button tests include one or more of a power button test, a datebook button test, an address button test, an up button test, a down button test, a to do button test and a memo button test. The set of test features includes a set of device features including one or more of a charging test, a light test, wherein the light test includes a backlight test and a brightness test, a soft reset test, an LCD test, a digitizer test, an IR beaming test, a device specific buttons test and a jog dial test. The device specific buttons test includes one or more of a hold button test, a capture button test, a record button test, a home button test and a graffiti button test. The jog dial test includes one or more of a jog up test, a jog down test, a jog press test and a back test. The set of test features includes a set of advanced device features including one or more of a memory stick test, wherein the memory stick test includes a memory stick detect test, a memory stick write test and a memory stick read test, a RAM test, a sound test, wherein the sound test includes a system sound test, a FM speaker test and a headphone test and a hotsync test. The set of results includes a main test listing, a sub-test listing and a test result listing for each of the set of test features. The system further comprises interfacing a user and the electronic device with a graphical user interface, wherein the user manually confirms completion of one or more of the set of test features.

In yet another aspect of the present invention, a diagnostic system for automatically diagnosing software and hardware defects comprises a removable memory including an application, an electronic device configured to receive the removable memory, wherein the application is automatically executed and a set of test features is automatically completed upon insertion of the removable memory into the electronic device, and further wherein the set of test features are included in the application and a graphical user interface, wherein the graphical user interface is configured to display the set of test features and a set of test results, wherein completion of the set of test features is confirmed automatically by the application. The system further comprises a hold button, wherein the hold button is set to an off position before the removable memory is inserted into the electronic device. The system further comprises a hard reset button, wherein the hard reset button is activated before the hold button is set to the off position. The set of test features includes a set of basic OS features including a set of OS button tests. The set of OS button tests include one or more of a power button test, a datebook button test, an address button test, an up button test, a down button test, a to do button test and a memo button test. The set of test features includes a set of device features including one or more of a charging test, a light test, wherein the light test includes a backlight test and a brightness test, a soft reset test, an LCD test, a digitizer test, an IR beaming test, a device specific buttons test and a jog dial test. The device specific buttons test includes one or more of a hold button test, a capture button test, a record button test, a home button test and a graffiti button test. The jog dial test includes one or more of a jog up test, a jog down test, a jog press test and a back test. The set of test features includes a set of advanced device features including one or more of a memory stick test, wherein the memory stick test includes a memory stick detect test, a memory stick write test and a memory stick read test, a RAM test, a sound test, wherein the sound test includes a system sound test, a FM speaker test and a headphone test and a hotsync test. The set of results includes a main test listing, a sub-test listing and a test result listing for each of the set of test features. The user manually confirms completion of one or more of the set of test features.

In still another aspect of the present invention, a personal digital assistant for self diagnosing software and hardware defects comprises a memory slot configured to receive a removable memory, wherein the removable memory includes an application, further wherein the application is automatically executed and a set of test features is automatically completed upon insertion of the removable memory into the memory slot of the personal digital assistant, and further wherein the set of test features are included in the application and a graphical user interface configured to display the set of test features and a set of test results, wherein completion of the set of test features is confirmed automatically by the application. The graphical user interface displays the set of test features, and further wherein the set of test features include a set of main test features and a set of sub-test features. The set of main test features are displayed on a main test display of the graphical user interface, and further wherein the main test feature that is currently active is highlighted. The graphical user interface further includes a toggle button configured to hide the main test display. The set of sub-test features are displayed on a sub-test display of the graphical user interface, and further wherein the sub-test feature that is currently active is highlighted. The graphical user interface displays the set of results in a summary display, wherein the set of test results include a main test listing, a sub-test listing and a test result listing for each of the set of test features. The system further comprises an instruction display and a confirmation prompt, the confirmation prompt configured to enable a user to confirm the completion of any of the set of test features. The system further comprises at least one test button configured to enable the user to control the set of test features.

BRIEF DESCRIPTION OF THE DRAWINGS

FIG. 4 illustrates an exemplary summary table according to the present invention.

DETAILED DESCRIPTION OF THE EMBODIMENTS

Figure 1:
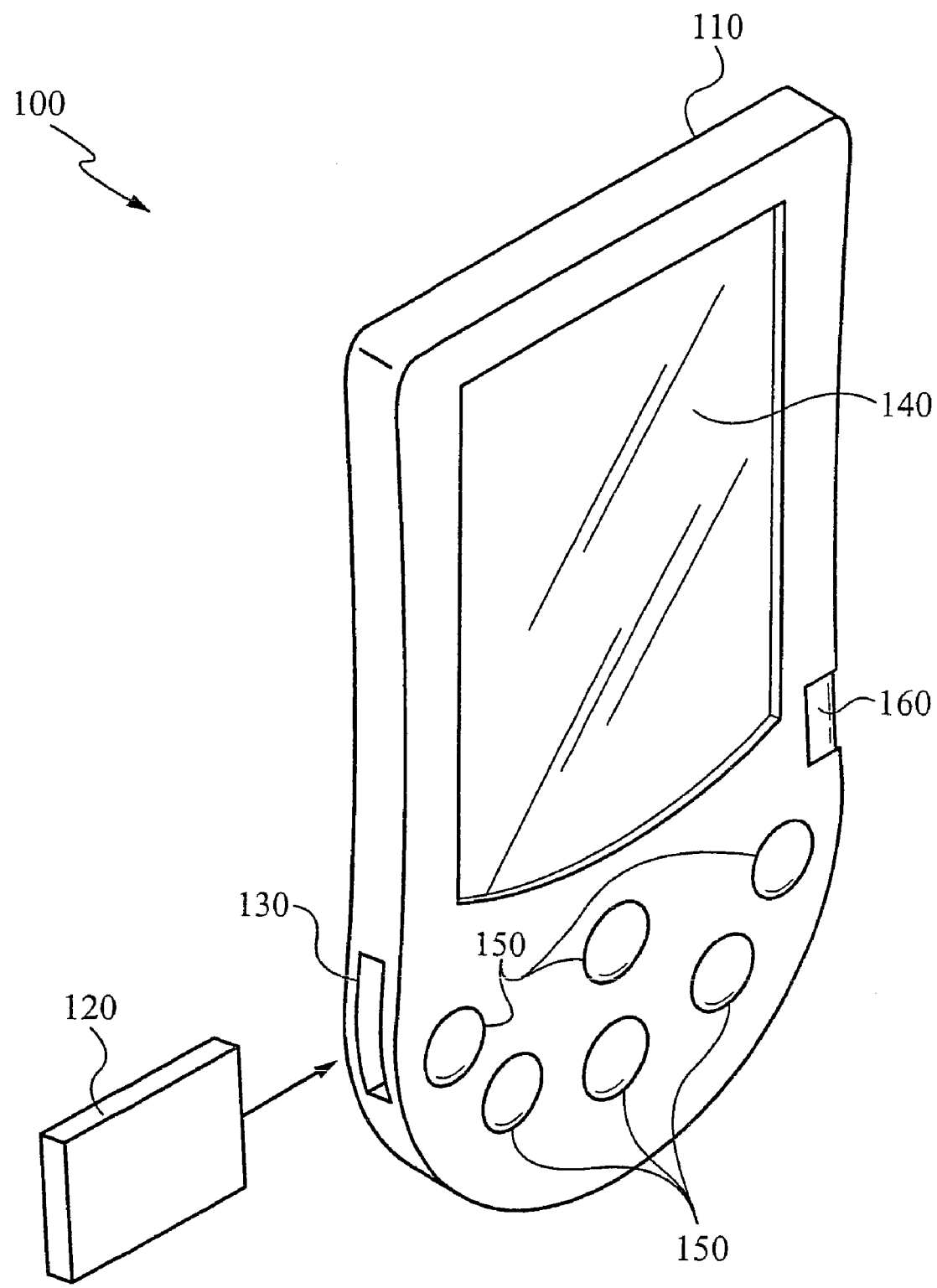
FIG. 1 illustrates a graphical representation of the apparatus according to an embodiment of the present invention.

Embodiments of the present invention include a method of, apparatus and graphical user interface for performing automatic and interactive diagnostics and repair on an electronic device. Referring to FIG. 1, the diagnostic apparatus 100 of the preferred embodiment of the present invention is depicted. The diagnostic apparatus 100 of the preferred embodiment includes an electronic device 110 and removable memory 120. A personal digital assistant (PDA) is depicted in FIG. 1 as the electronic device 110. While a PDA is depicted here in the preferred embodiment of the present invention, alternative embodiments may utilize any electronic device 110 capable of housing removable memory 120 and supporting a graphical user interface (GUI) on a viewing screen 140. Additionally, the preferred embodiment contemplates the removable memory 120 as a Memory Stick® device such as those developed by Sony Corporation. The use of such removable memory 120 in the preferred embodiment of course depends on the compatibility of such removable memory 120 with the electronic device 110. As will be apparent to those skilled in the art, alternatively, any removable memory which is compatible to the PDA being tested can be utilized.

Still referring to FIG. 1, the electronic device 110 of the diagnostic apparatus 100 receives the removable memory 120 in a memory slot 130. The diagnostic method is stored electronically on the removable memory 120, and when the removable memory is inserted into the memory slot 130, the diagnostic method is automatically started and displayed on a GUI on the viewing screen 140. The details of the method and the GUI will be discussed in greater detail later in this document. The user of this method and diagnostic apparatus 100 can interact with the diagnostic method using control buttons 150 and by touching the viewing screen 140 if the electronic device 110 is equipped with a touch sensitive viewing screen 140, as is contemplated in the preferred embodiment of the present invention. The user of this diagnostic apparatus 100 will follow the automatic prompts provided by the diagnostic method as it completes diagnosing and repairing various problems that may occur with the electronic device 110.

Figure 2:
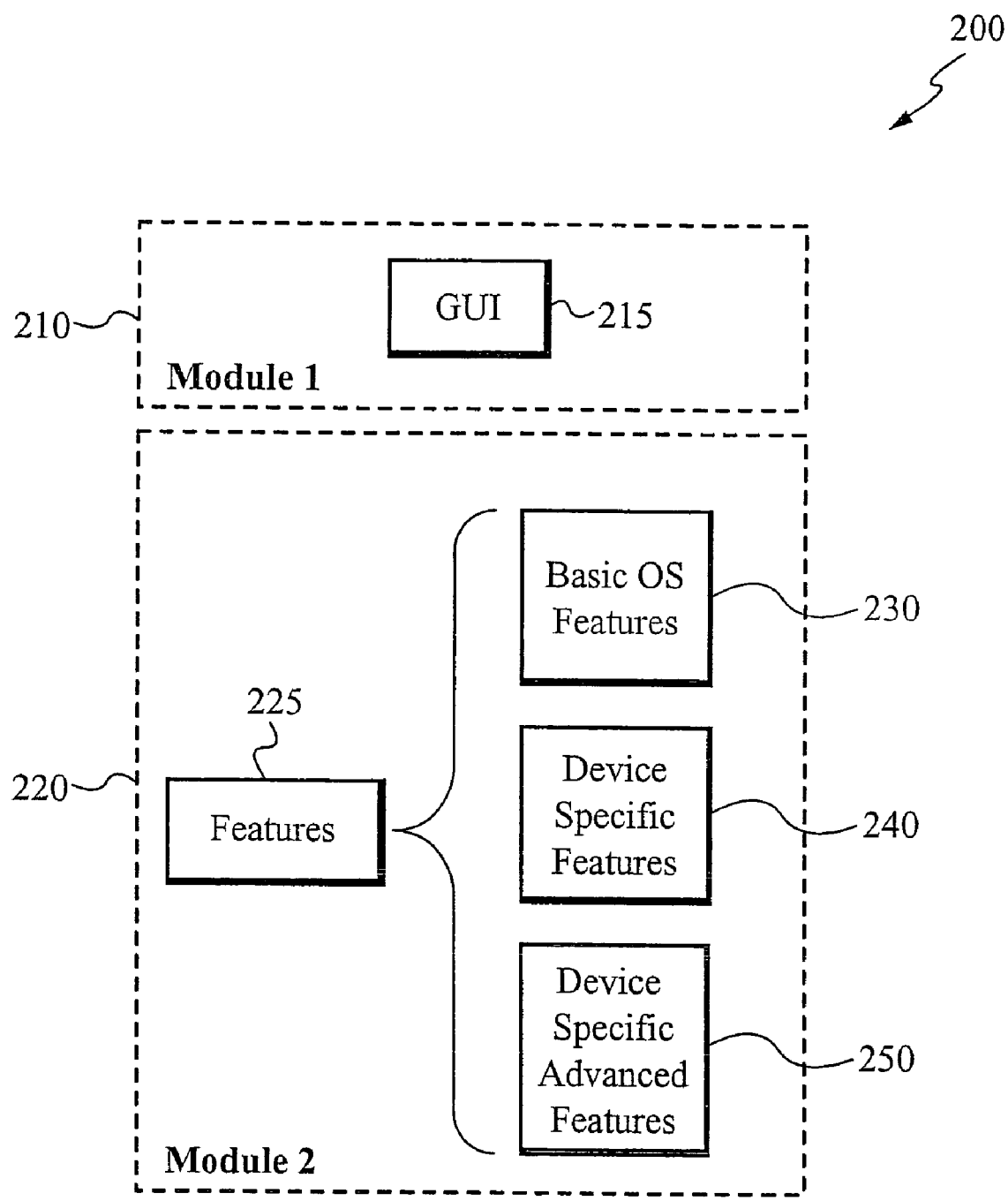
FIG. 2 illustrates a block diagram of two modules according to the present invention.

Referring now to FIG. 2, the preferred embodiment of the present invention includes a design architecture 200 that is divided into a GUI module 210 and a features module 220. The GUI module 210 includes the GUI 215 that graphically interfaces the features 225 that are included in the diagnostic method with a user. The GUI module 210 does this by building a list of actions to be performed according to the features module 220, iterates the list and performs the tests. Again, the specific operation of the GUI 215 as it relates to the user interface will be described later in this document.

Referring back to FIG. 2, the features module 220 preferably implements three types of features 225 into the diagnostic method. These features include basic operating system (OS) features 230, device specific features 240 and device specific advanced features 250. The basic OS features 230 preferably include test items that test the functionality of the general operating systems of the electronic device 110. In the preferred embodiment of the present invention, where the electronic device 110 is a PDA, these basic OS features include such things as functionality of the power, Datebook, Address To Do and Memo buttons. Of course, this list is exemplary as any and all basic OS features 230 may be included in this group of test items.

The device specific features 240 preferably include test items that test the functionality of items that are specific to that particular electronic device 110. Such device specific features 240 of a PDA include, but are not limited to, battery charging, backlight function, light brightness, soft reset, digitizer, LCD, beaming, such PDA buttons as hold, capture, record, home and graffiti, as well as the jog dial functions: up, down, press and back.

The device specific advanced features 250 preferably include test items that test the functionality of advanced functions that are specific to that particular electronic device 110. In the preferred embodiment, such device specific advance features 250 of a PDA may include, but are not limited to, memory stick operations such as detect, write and read, RAM functionality, sound and hot sync. Again, features 225 in any of the three above-mentioned categories, i.e. basic operating system features 230, device specific features 240 and device specific advanced features 250, may be custom-tailored to correspond to the particular electronic device 110. However, it should be noted that the preferred embodiment of the present invention includes the features 225 listed above, as related to the operation of a PDA.

Figure 3:
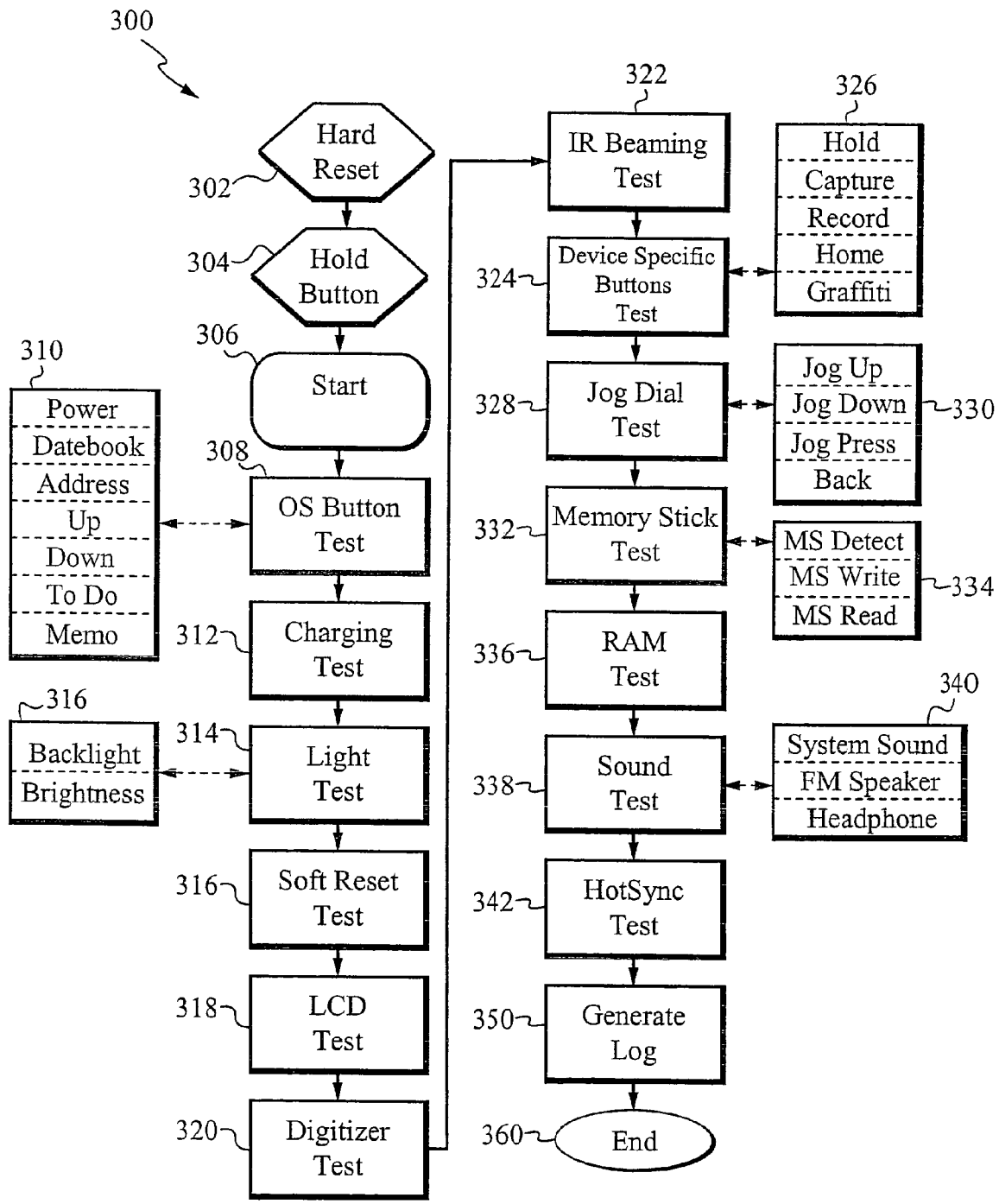
FIG. 3 illustrates a flow chart of a method of diagnostic testing according to the present invention.

A method of the preferred embodiment of the present invention is depicted in FIG. 3. Referring to FIG. 1 and FIG. 3 simultaneously, in the preferred embodiment of the present invention where the electronic device 110 is a PDA, the automated diagnostic method 300 begins by the user engaging a hard reset at the step 302, on the PDA. At the step 304, the user sets the hold button to the "off" position, and at the step 306, inserts the removable memory 120 into the memory slot 130 of the electronic device 110. The removable memory 120 includes code that automatically launches the diagnostic test according to the remainder of the automated diagnostic memory 300.

Still referring to FIG. 1 and FIG. 3, at the step 308 the OS buttons are tested. Each OS button will be tested at the step 308 by a user pressing each control button 150 manually, and then the status of each button, e.g. pass or fail, is displayed on the GUI 140. The step 310 is an exemplary list of the various OS button tests that can be performed. Alternative embodiments may include more, less or other OS button tests other than those listed at the step 310. At the step 312, the user will be prompted to connect an AC adapter.

Still referring to FIG. 1 and FIG. 3, the viewing screen 140 light will be tested at the step 314. The two operations that are tested in the preferred embodiment are shown at the step 316. First, the user will be prompted to press the power button 160 for a period of time in order to toggle the backlight of the viewing screen 160. The user will verify the completion of this test using the graphical user interface on the viewing screen 140. Next, the user will be prompted to adjust the brightness at the step 316. When the brightness is adjusted, the user will again verify that the adjustment has been made and that the test is completed using the graphical user interface on the viewing screen 140. At the step 316, the user will be asked to perform a soft reset of the electronic device 110 by pressing the reset button of the electronic device 110. The method verifies that the user has performed this operation before moving on to the step 318. At the step 318, patterns are displayed on the viewing screen 140 after the soft reset at the step 316. The user is prompted to confirm that the patterns are displayed. At the step 320, the user is asked to touch certain points on the viewing screen 140 in order to test that the touch sensitive feature of the viewing screen 140 is operating properly. The method will verify that step 320 is completed, before moving on to the step 322.

In the preferred embodiment of the present invention, the electronic device 110 in FIG. 1 is a PDA device having information beaming capabilities. Still referring to FIG. 1 and FIG. 3, at the step 322, the user is asked to place another electronic device 110, preferably a PDA having information beaming capabilities within 8–20 inches from the electronic device 110. The method attempts to beam data to the other device and verify that the beaming was successful, at the step 322. At the step 324, the user is prompted to press each device specific control button 150 to verify that they are functional. An exemplary list of the device specific buttons is included at the step 326. Of course, additional device specific control buttons 150 may be added or deleted from the step 326 as electronic devices 110 may have more or less control buttons 150. At the step 328, each jog dial operation is tested by the user pressing it manually. The method verifies that the jog dial operation is functioning before the method moves on to the step 332. Referring back to the step 328, an exemplary representation of the jog dial functions that can be tested are shown at the step 330. These jog dial functions include, but are not limited to: jog up; jog down; jog press; and back.

At the step 332, the user is asked to insert a removable memory 120 into the memory slot 130 of the electronic device 110. The method then checks to determine whether the memory stick is locked and will then try to read and write data to and from the electronic device 110. A memory stick is locked by sliding a switch on the memory stick to a lock position so that the data on the memory still is write protected. Results of this test will be verified by the method. At the step 336, the method automatically tests and verifies that the random access memory (RAM) of the electronic device 110 is operating correctly, and at the step 338, the sound capability of the electronic device is tested by the method playing a sample sound. The user verifies that each sound was heard. This step can be repeated for any sound capabilities of the electronic device 110. A set of exemplary sound capabilities is depicted at the step 340, where the method will test a system sound, an FM speaker and a headphone plug. Of course, the set in the step 340 is exemplary only, and may be modified according to the sound capabilities of the electronic device 110. At the step 342, the user is instructed to perform a hotsync operation by activating the hotsync button on the cradle of the PDA. The method verifies that a hotsync was executed.

Still referring to FIG. 3, the method generates a log at the step 350 before the method ends at the step 360. At the step 350, the log is preferably displayed on the viewing screen 140 and saved to the removable memory 120 in the electronic device 110 everytime the method ends or is interrupted. It should be noted that method steps can be added or deleted according to the preference of the user and according to the features of the particular electronic device 110.

An exemplary log 400 of the preferred embodiment of the present invention is depicted in FIG. 4. The log 400 includes the creation time 410 of the log 400 in day, date and time. The creation time 410 indicates the precise moment that the log 400 was created, which is either at the completion of the diagnostic method 300 or when the diagnostic method is interrupted. The log 400 also includes the operating system 420 that is running on the electronic device 110 (FIG. 1) as well as the serial number 430 of the electronic device 110. The format of the log reflects the results of the diagnostic method 300 and is stored on the removable memory 120. The format includes a main test category 440, a sub-test category 450 and a test result category 460. The main test category 440 includes the main test steps that were tested in the diagnostic method 300 (FIG. 3). The sub-test category 450 includes the device specific steps that were tested in the diagnostic method 300. In FIG. 3, the sub-test category 450 is depicted as steps 310, 316, 326, 330, 334 and 340. The test result category 460 indicates the status of each test step in the diagnostic method 300. This test result category 460 indicates the result of each test in the diagnostic method 300 in terms of whether a test passed, failed or was skipped.

Figure 5A:
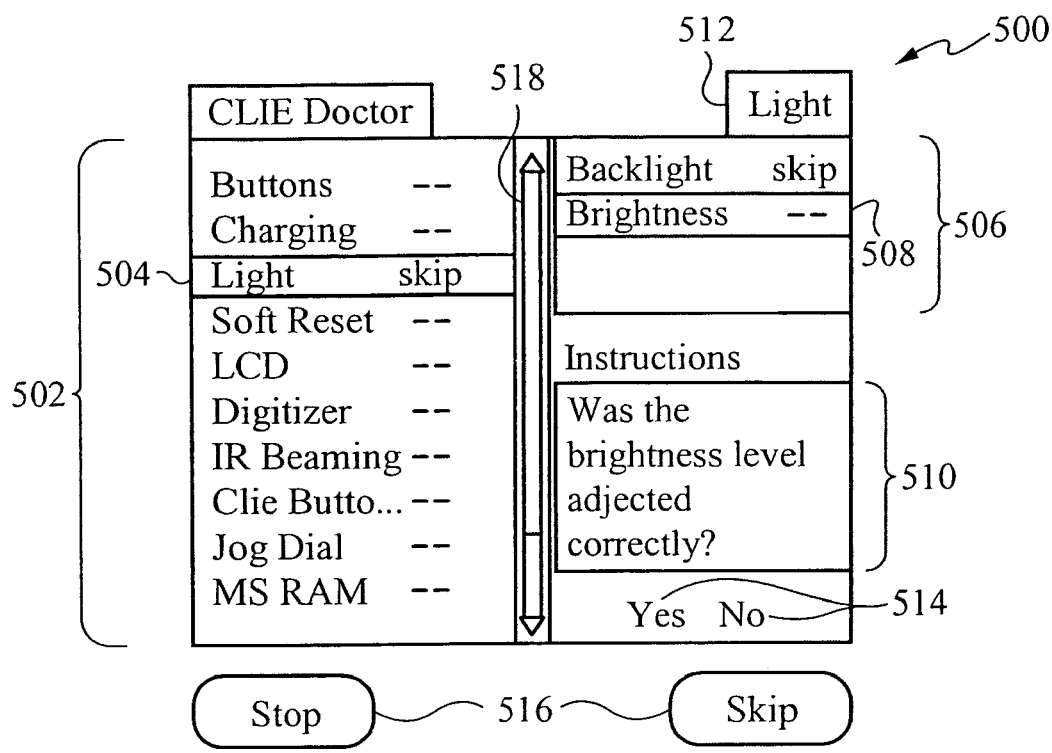
FIGS. 5a–5c illustrate a graphical user interface according to the present invention.

Referring now to FIG. 5a, a graphical user interface (GUI) 500 of the preferred embodiment of the present invention is depicted. The GUI 500 preferably includes a main test display 502 that includes all of the main test categories that can be performed by the diagnostic test as well as the status of each main test category. The active main test 504 that is currently being performed is highlighted in the main test display 502. In this view, the scroll bar 518 is used to scroll through the main test display in order to view every main test item and its corresponding status. The sub-test display 506 includes all of the sub-test categories for the active main test 504 in the main test display 502. The active sub-test 508 that is currently being performed is highlighted in the sub-test display 506. The instruction display 510 instructs the user through the active sub-test 508 by instructing the user when manual operations or confirmations need to be performed.

The user may confirm manual or automatic test operations by responding to the confirmation prompt 514. As depicted, the preferred embodiment of the present invention includes a "Yes/No" confirmation prompt 514, that asks the user whether a particular test was completed in a proper fashion. Referring to FIG. 5c, the preferred embodiment may also include an "OK" confirmation prompt 514 that the user selects before the next instruction appears in the instruction display 510. In FIG. 5c, selecting the confirmation prompt 514 will end the test as the GUI 500 is displaying the summary display 520, the details for which will be discussed below. In the preferred embodiment of the present invention, the confirmation prompt appears on the GUI 500 when the active sub-test 508 is not automatic and needs user input to complete. Referring back to FIG. 5a, test buttons 516 allow the user to stop, start or skip a test as the user chooses.

Figure 5B:
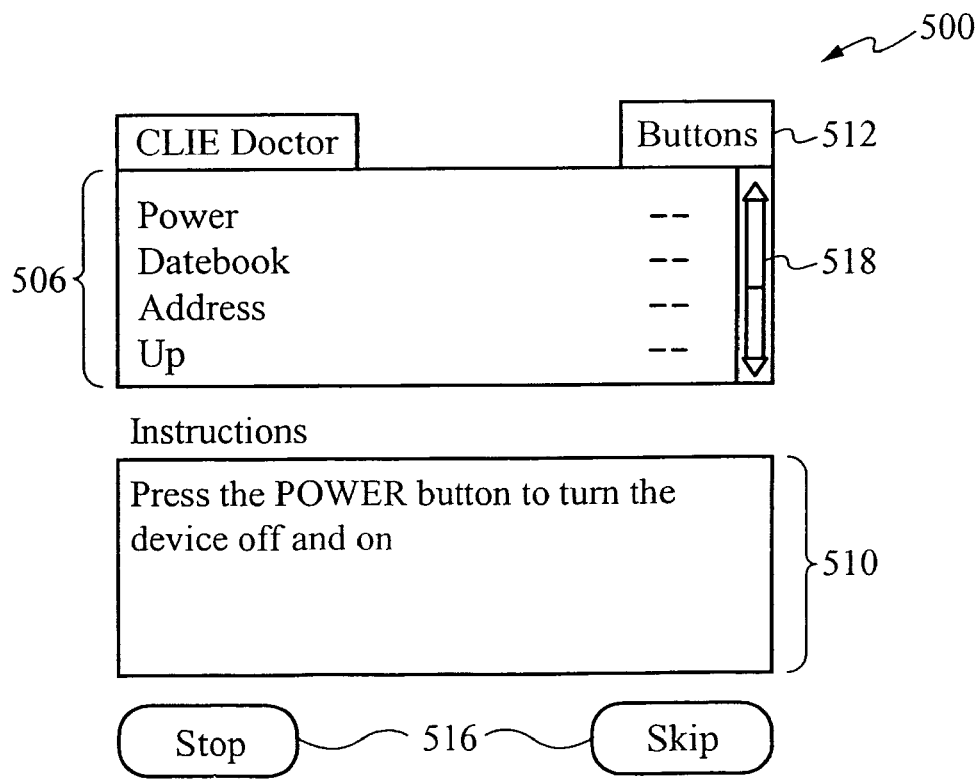
Figure 5C:
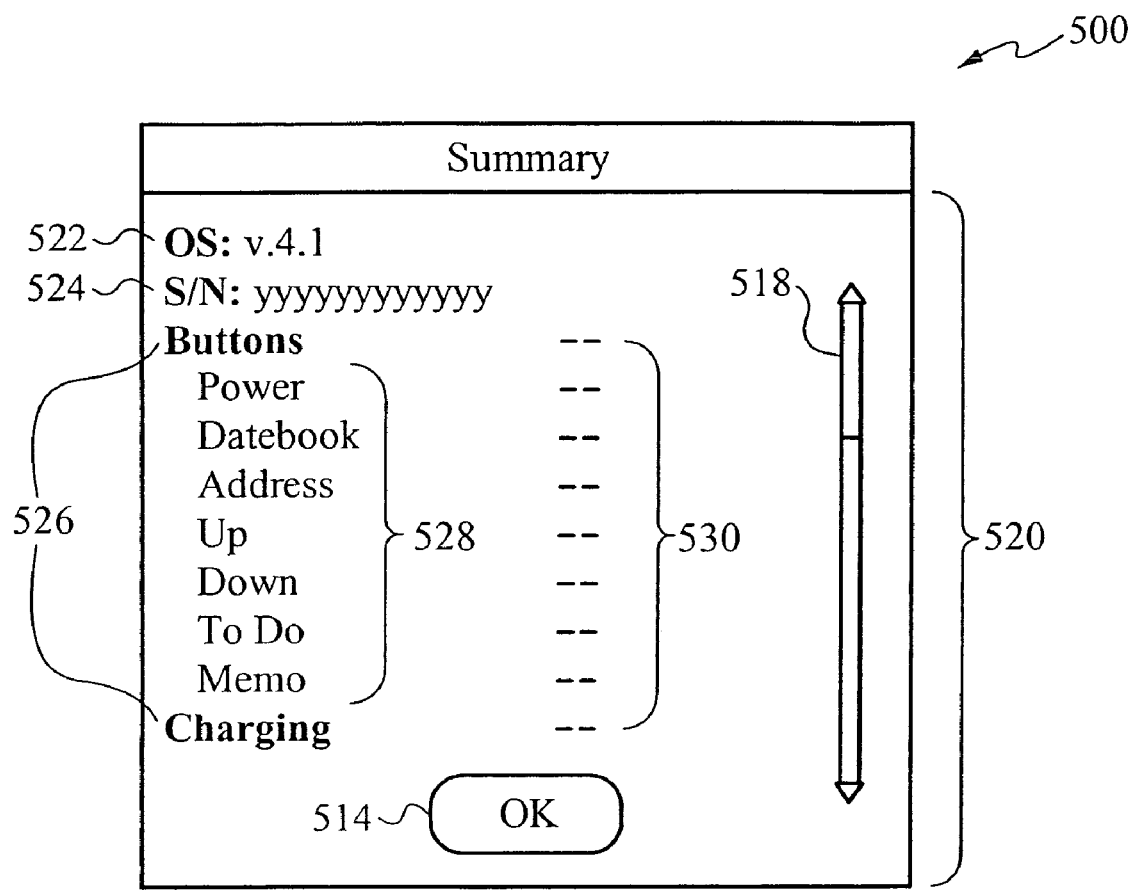

Referring now to FIG. 5a and FIG. 5b simultaneously, the expand/collapse button 512 allows the user to expand (FIG. 5b) or collapse (FIG. 5a) the sub-test display 506 and the instruction display 510. The expand/collapse button 512 includes the name of the active main test 504 and the scroll bar 518 in the expand view (FIG. 5b) scrolls the sub-test display 506. In the preferred embodiment, the size or location of the test buttons 516 are not affected by the expand/collapse button 512.

Referring now to FIG. 5c, the preferred embodiment of the present invention includes the summary display 520. The summary display 520 provides the user with test results 530 for every main test category 526 and every sub-test category 528. In this summary display 520, the scroll bar 518 is used by the user to scroll through the main test categories 526, the sub-test categories 528 and the corresponding test results. Of course, the summary display 520 depicted in FIG. 5c is exemplary only as more or less main test categories 526 as well as sub-test categories may appear in the summary display 520 according to the particular test being performed. Still referring to FIG. 5c, the summary display 520 also displays the operating system 522 of the device being tested, as well as the serial number 524 of the device being tested. By pressing the confirmation prompt 514 in the summary display 520, the user ends the test.

Utilizing the diagnostic method of the present invention, a user preferably inserts a memory device into a PDA or other electronic device. The memory device preferably includes the diagnostic application of the present invention. When the memory device is inserted into the PDA, the diagnostic application preferably begins and automatically tests the operability and functionality of the PDA. As part of this diagnostic method, for operations or functions that require user input, the diagnostic application provides prompts to the user on the display of the PDA. The user is then provided with a log of the tests performed and the results of such tests, in order for the user to determine if anything is not operating or functioning properly on the PDA.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, it will be apparent to one of ordinary skill in the art that while the preferred embodiment of the present invention is used with PDAs, the present invention can also be implemented on any other appropriate electronic device.

What is claimed is:

1. A method of automatically diagnosing software and hardware defects in an electronic device, the method of diagnosing comprising:
   a. inserting a removable memory into the electronic device, the removable memory including an application;
   b. executing the application automatically upon insertion of the removable memory into the electronic device;
   c. completing a set of test features included in the application; and
   d. generating a log file including a set of results corresponding to the set of test features, wherein completion of the set of test features is confirmed automatically by the application, and further wherein the set of results includes a main test listing, a sub-test listing and a test result listing for each of the set of test features.

2. The method according to claim 1 further comprising setting a hold button to an off position, wherein the hold button is set to the off position before the removable memory is inserted into the electronic device.

3. The method according to claim 2 further comprising performing a hard reset on the electronic device, wherein the hard reset is performed before the hold button is set to the off position.

4. The method according to claim 1 wherein the set of test features includes a set of basic OS features including a set of OS button tests.

5. The method according to claim 4 wherein the set of OS button tests include one or more of:
 a. a power button test;
 b. a datebook button test;
 c. an address button test;
 d. an up button test;
 e. a down button test;
 f. a to do button test; and
 g. a memo button test.

6. The method according to claim 1 wherein the set of test features includes a set of device features including one or more of:
 a. a charging test;
 b. a light test, wherein the light test includes a backlight test and a brightness test;
 c. a soft reset test;
 d. an LCD test;
 e. a digitizer test;
 f. an IR beaming test;
 g. a device specific buttons test; and
 h. a jog dial test.

7. The method according to claim 6 wherein the device specific buttons test includes one or more of:
 a. a hold button test;
 b. a capture button test;
 c. a record button test;
 d. a home button test; and
 e. a graffiti button test.

8. The method according to claim 6 wherein the jog dial test includes one or more of:
 a. a jog up test;
 b. a jog down test;
 c. a jog press test; and
 d. a back test.

9. The method according to claim 1 wherein the set of test features includes a set of advanced device features including one or more of:
 a. a memory stick test, wherein the memory stick test includes a memory stick detect test, a memory stick write test and a memory stick read test;
 b. a RAM test;
 c. a sound test, wherein the sound test includes a system sound test, a FM speaker test and a headphone test; and
 d. a hotsync test.

10. The method according to claim 1 further comprising interfacing a user and the electronic device with a graphical user interface, wherein the user manually confirms completion of one or more of the set of test features.

11. A diagnostic system for automatically diagnosing software and hardware defects in an electronic device, the diagnostic system comprising:
 a. means for inserting a removable memory into the electronic device, the removable memory including an application;
 b. means for executing the application automatically upon insertion of the removable memory into the electronic device;
 c. means for completing a set of test features included in the application; and
 d. means for generating a log file including a set of results corresponding to the set of test features,
 wherein completion of the set of test features is confirmed automatically by the application, and further wherein the set of results includes a main test listing, a sub-test listing and a test result listing for each of the set of test features.

12. The system according to claim 11 further comprising means for setting a hold button to an off position, wherein the hold button is set to the off position before the removable memory is inserted into the electronic device.

13. The system according to claim 12 further comprising means for performing a hard reset on the electronic device, wherein the hard reset is performed before the hold button is set to the off position.

14. The system according to claim 11 wherein the set of test features includes a set of basic OS features including a set of OS button tests.

15. The system according to claim 14 wherein the set of OS button tests include one or more of:
 a. a power button test;
 b. a datebook button test;
 c. an address button test;
 d. an up button test;
 e. a down button test;
 f. a to do button test; and
 g. a memo button test.

16. The system according to claim 11 wherein the set of test features includes a set of device features including one or more of:
 a. a charging test;
 b. a light test, wherein the light test includes a backlight test and a brightness test;
 c. a soft reset test;
 d. an LCD test;
 e. a digitizer test;
 f. an IR beaming test;
 g. a device specific buttons test; and
 h. a jog dial test.

17. The system according to claim 16 wherein the device specific buttons test includes one or more of:
 a. a hold button test;
 b. a capture button test;
 c. a record button test;
 d. a home button test; and
 e. a graffiti button test.

18. The system according to claim 16 wherein the jog dial test includes one or more of:
 a. a jog up test;
 b. a jog down test;
 c. a jog press test; and
 d. a back test.

19. The system according to claim 11 wherein the set of test features includes a set of advanced device features including one or more of:
 a. a memory stick test, wherein the memory stick test includes a memory stick detect test, a memory stick write test and a memory stick read test;

b. a RAM test;
c. a sound test, wherein the sound test includes a system sound test, a FM speaker test and a headphone test; and
d. a hotsync test.

20. The system according to claim 11 further comprising interfacing a user and the electronic device with a graphical user interface, wherein the user manually confirms completion of one or more of the set of test features.

21. A diagnostic system for automatically diagnosing software and hardware defects, the diagnostic system comprising:
   a. a removable memory including an application;
   b. an electronic device configured to receive the removable memory, wherein the application is automatically executed and a set of test features is automatically completed upon insertion of the removable memory into the electronic device, and further wherein the set of test features are included in the application; and
   c. a graphical user interface, wherein the graphical user interface is configured to display the set of test features and a set of test results,
   wherein completion of the set of test features is confirmed automatically by the application, and further wherein the set of results includes a main test listing, a sub-test listing and a test result listing for each of the set of test features.

22. The system according to claim 21 further comprising a hold button, wherein the hold button is set to an off position before the removable memory is inserted into the electronic device.

23. The system according to claim 22 further comprising a hard reset button, wherein the hard reset button is activated before the hold button is set to the off position.

24. The system according to claim 21 wherein the set of test features includes a set of basic OS features including a set of OS button tests.

25. The system according to claim 24 wherein the set of OS button tests include one or more of:
   a. a power button test;
   b. a datebook button test;
   c. an address button test;
   d. an up button test;
   e. a down button test;
   f. a to do button test; and
   g. a memo button test.

26. The system according to claim 21 wherein the set of test features includes a set of device features including one or more of:
   a. a charging test;
   b. a light test, wherein the light test includes a backlight test and a brightness test;
   c. a soft reset test;
   d. an LCD test;
   e. a digitizer test;
   f. an IR beaming test;
   g. a device specific buttons test; and
   h. a jog dial test.

27. The system according to claim 26 wherein the device specific buttons test includes one or more of:
   a. a hold button test;
   b. a capture button test;
   c. a record button test;
   d. a home button test; and
   e. a graffiti button test.

28. The system according to claim 26 wherein the jog dial test includes one or more of:

a. a jog up test;
b. a jog down test;
c. a jog press test; and
d. a back test.

29. The system according to claim 21 wherein the set of test features includes a set of advanced device features including one or more of:
   a. a memory stick test, wherein the memory stick test includes a memory stick detect test, a memory stick write test and a memory stick read test;
   b. a RAM test;
   c. a sound test, wherein the sound test includes a system sound test, a FM speaker test and a headphone test; and
   d. a hotsync test.

30. The system according to claim 21 wherein the user manually confirms completion of one or more of the set of test features.

31. A personal digital assistant for self diagnosing software and hardware defects, the personal digital assistant comprising:
   a. a memory slot configured to receive a removable memory, wherein the removable memory includes an application, further wherein the application is automatically executed and a set of test features is automatically completed upon insertion of the removable memory into the memory slot of the personal digital assistant, and further wherein the set of test features are included in the application; and
   b. a graphical user interface configured to display the set of test features and a set of test results,
   wherein completion of the set of test features is confirmed automatically by the application, wherein the graphical user interface displays the set of test features, and further wherein the set of test features include a set of main test features and a set of sub-test features.

32. The system according to claim 31 wherein the set of main test features are displayed on a main test display of the graphical user interface, and further wherein the main test feature that is currently active is highlighted.

33. The system according to claim 32 wherein the graphical user interface further includes a toggle button configured to hide the main test display.

34. The system according to claim 31 wherein the set of sub-test features are displayed on a sub-test display of the graphical user interface, and further wherein the sub-test feature that is currently active is highlighted.

35. The system according to claim 31 further comprising an instruction display and a confirmation prompt, the confirmation prompt configured to enable a user to confirm the completion of any of the set of test features.

36. The system according to claim 31 further comprising at least one test button configured to enable the user to control the set of test features.

37. A personal digital assistant for self diagnosing software and hardware defects, the personal digital assistant comprising:
   a. a memory slot configured to receive a removable memory, wherein the removable memory includes an application, further wherein the application is automatically executed and a set of test features is automatically completed upon insertion of the removable memory into the memory slot of the personal digital assistant, and further wherein the set of test features are included in the application; and
   b. a graphical user interface configured to display the set of test features and a set of test results, wherein completion of the set of test features is confirmed automatically by the application, and further wherein the graphical user interface displays the set of results in a summary display, wherein the set of test results include a main test listing, a sub-test listing and a test result listing for each of the set of test features.

* * * * *